US009718627B2

(12) United States Patent
Cifelli

(10) Patent No.: US 9,718,627 B2
(45) Date of Patent: Aug. 1, 2017

(54) EQUIPMENT AND METHOD FOR MOVING CONTAINERS

(71) Applicant: Carmine Cifelli, Sao Paulo (BR)

(72) Inventor: Carmine Cifelli, Sao Paulo (BR)

(*) Notice: Subject to any disclaimer, the term of this patent is extended or adjusted under 35 U.S.C. 154(b) by 0 days.

(21) Appl. No.: 14/916,790

(22) PCT Filed: Sep. 4, 2014

(86) PCT No.: PCT/BR2014/000309
§ 371 (c)(1),
(2) Date: Mar. 4, 2016

(87) PCT Pub. No.: WO2015/031969
PCT Pub. Date: Mar. 12, 2015

(65) Prior Publication Data
US 2016/0194164 A1 Jul. 7, 2016

(30) Foreign Application Priority Data
Sep. 5, 2013 (BR) .............................. 102013022724

(51) Int. Cl.
*B65G 57/30* (2006.01)
*B65G 59/06* (2006.01)
*B65G 63/06* (2006.01)
*B65D 90/12* (2006.01)

(52) U.S. Cl.
CPC ............ *B65G 57/30* (2013.01); *B65D 90/125* (2013.01); *B65G 59/061* (2013.01); *B65G 63/065* (2013.01)

(58) Field of Classification Search
CPC ......... B66F 9/07; E04H 6/422; B65G 1/0478; B65G 1/0407; B65G 63/004; B65G 1/026; B65G 1/0428; B65G 1/0471; B65G 57/30; B65G 59/061; B65G 63/065; B65D 88/129; B65D 90/125; B66C 19/002; B66C 17/20
USPC .................... 254/88, 104; 414/281, 264, 282
See application file for complete search history.

(56) References Cited

U.S. PATENT DOCUMENTS

| | | | | |
|---|---|---|---|---|
| 1,274,554 A | * | 8/1918 | Ives ........................... | B27L 7/06 254/104 |
| 1,903,274 A | * | 3/1933 | Watson ................... | E04H 6/183 212/327 |
| 2,652,938 A | * | 9/1953 | Murphy .................... | B66F 9/07 414/260 |
| 2,714,456 A | * | 8/1955 | Manaugh ................ | E04H 6/183 414/253 |
| 2,929,520 A | * | 3/1960 | Mellam .................... | B63B 25/20 414/142.6 |
| 2,951,599 A | * | 9/1960 | Bogar ..................... | E04H 6/183 414/256 |
| 3,011,660 A | * | 12/1961 | Shutt ....................... | E04H 6/183 414/255 |
| 3,294,260 A | * | 12/1966 | Erangos ................... | E04H 6/18 414/239 |

(Continued)

*Primary Examiner* — Joseph J Hail
*Assistant Examiner* — J Stephen Taylor
(74) *Attorney, Agent, or Firm* — Hoglund & Pamias, PSC; Roberto J. Rios

(57) ABSTRACT

The equipment and method for moving containers herein proposed consists in a new concept for moving containers in port terminals based on the stacking of containers from the bottom to the top. Such stacking occurs by using a lifting system specifically designed for such purpose and by supporting the containers stack on fixed elevated support at a determined height from the ground.

15 Claims, 15 Drawing Sheets

(56) References Cited

U.S. PATENT DOCUMENTS

| | | | | |
|---|---|---|---|---|
| 3,380,422 A * | 4/1968 | Bachko | B63B 25/004 | 114/72 |
| 3,447,697 A * | 6/1969 | Dolin | B66F 9/07 | 414/608 |
| 3,468,437 A * | 9/1969 | Miller | B65D 90/16 | 104/134 |
| 3,498,477 A * | 3/1970 | Sommer | B63B 27/12 | 114/201 R |
| 3,557,973 A * | 1/1971 | Bussienne | B65G 1/065 | 104/48 |
| 3,559,822 A * | 2/1971 | Lichtenford | B65G 1/0407 | 414/140.3 |
| 3,608,750 A * | 9/1971 | Young | B65G 1/0414 | 414/277 |
| 3,622,020 A * | 11/1971 | Sarvary | B65G 1/06 | 414/279 |
| 3,719,288 A * | 3/1973 | Schmitt | B65G 1/0435 | 198/597 |
| 3,730,358 A * | 5/1973 | Oji | B65G 1/0464 | 211/1.57 |
| 3,779,403 A * | 12/1973 | Young | B65G 1/0414 | 414/279 |
| 3,836,020 A * | 9/1974 | Lassig | B61J 1/10 | 414/281 |
| 3,927,773 A * | 12/1975 | Bright | B65G 1/06 | 414/273 |
| 3,993,202 A * | 11/1976 | Neitzel | B66F 9/07 | 212/328 |
| 4,067,284 A * | 1/1978 | Yasushi | B63B 25/006 | 114/260 |
| 4,244,615 A * | 1/1981 | Brown | B63B 25/004 | 294/81.1 |
| 4,265,582 A * | 5/1981 | Theobald | B65G 1/0485 | 187/269 |
| 4,428,708 A * | 1/1984 | Burt | B65G 1/0421 | 414/275 |
| 4,535,689 A * | 8/1985 | Putkowski | B30B 1/40 | 100/214 |
| 4,642,017 A * | 2/1987 | Fenn | G06Q 10/08 | 212/312 |
| 4,773,807 A * | 9/1988 | Kroll | B65G 1/0485 | 414/266 |
| 4,820,101 A * | 4/1989 | Fenn | G06Q 10/08 | 177/147 |
| 4,820,109 A * | 4/1989 | Witt | G11B 15/6835 | 360/69 |
| 4,883,401 A * | 11/1989 | Kavieff | B65G 1/0485 | 414/273 |
| 4,897,012 A * | 1/1990 | Brewer | B65G 67/603 | 187/407 |
| 4,923,354 A * | 5/1990 | Giuliano | B65G 49/085 | 211/151 |
| 5,062,242 A * | 11/1991 | Corcoran | A47B 53/02 | 52/36.1 |
| 5,098,246 A * | 3/1992 | Jung | E04H 6/422 | 414/239 |
| 5,119,732 A * | 6/1992 | Lisy | E01B 23/00 | 104/102 |
| 5,140,787 A * | 8/1992 | Corcoran | A47B 53/02 | 312/198 |
| 5,147,176 A * | 9/1992 | Stolzer | B65G 1/0442 | 198/346.1 |
| 5,202,832 A * | 4/1993 | Lisy | G05D 1/0236 | 414/343 |
| 5,407,316 A * | 4/1995 | Coatta | B65G 63/004 | 414/277 |
| 5,505,585 A * | 4/1996 | Hubbard | B65G 63/004 | 414/139.4 |
| 5,860,783 A * | 1/1999 | Corcoran | B63B 25/004 | 414/141.5 |
| 6,077,019 A * | 6/2000 | Corcoran | B63B 25/004 | 414/142.6 |
| 6,113,336 A * | 9/2000 | Chang | B66F 9/07 | 414/281 |
| 6,644,089 B1 * | 11/2003 | Gorgen | B21D 39/021 | 29/243.58 |
| 6,842,665 B2 * | 1/2005 | Karlen | B63B 25/22 | 108/51.11 |
| 7,040,848 B2 * | 5/2006 | Sain | B63B 25/004 | 410/46 |
| 7,203,570 B2 * | 4/2007 | Karlen | B63B 25/22 | 414/143.2 |
| 7,261,509 B2 * | 8/2007 | Freudelsperger | B65G 1/1378 | 414/269 |
| 7,556,319 B1 * | 7/2009 | Boos | E04G 23/02 | 299/17 |
| 7,815,031 B2 * | 10/2010 | Schneider | B63B 25/004 | 198/347.1 |
| 7,941,243 B2 * | 5/2011 | Borgwarth | B65G 1/0478 | 198/463.3 |
| 7,959,017 B2 * | 6/2011 | Gerstner | A47F 5/0025 | 211/84 |
| 8,651,790 B2 * | 2/2014 | Benedict | B65G 1/0464 | 414/217 |
| 8,793,012 B2 * | 7/2014 | Corcoran | G01V 5/0008 | 414/281 |
| 8,961,095 B2 * | 2/2015 | Takahara | B60S 11/00 | 29/402.03 |
| 9,045,282 B2 * | 6/2015 | Yoshioka | B65G 1/02 | |
| 9,181,030 B2 * | 11/2015 | Zombori | B65G 1/04 | |
| 9,181,722 B2 * | 11/2015 | Rathbun | B66F 9/07 | |
| 2013/0071210 A1 * | 3/2013 | Lanigan, Sr. | B66C 17/06 | 414/281 |

* cited by examiner

A

B

C

US 9,718,627 B2

EQUIPMENT AND METHOD FOR MOVING CONTAINERS

TECHNICAL FIELD OF THE INVENTION

The present invention is inserted in the field of processing operations and discloses an equipment and a method for moving containers, with the aim to store and to arrange the containers in port terminals, in a way to optimize the space and the processes of moving the load.

STATE OF ART

The document US 20130071210 discloses a method for handling containers, which provides a multiple level structure, which presents, as advantages, the increase of container's movement and logistics, as well as the broad use in storing and delivery centers. On the other side, document U.S. Pat. No. 6,077,019 discloses a method for storing and a system for recovering containers. The document U.S. Pat. No. 3,779,403 discloses a device for handling big and heavy containers, with similar loads, capable of transferring such load between compartments of a vertical matrix.

ADVANTAGES OF THE INVENTION

In this sense, the present invention presents the advantages, when compared to the documents cited on the state of art, of proposing multiple simultaneous operations of storing, presenting a better occupation of the space through the elimination of halls, not demanding the construction of a fixed building structure.

Furthermore, the present invention presents the elastic capacity storing, adapting itself to the variations of the demand of containers to be stacked, and also presenting greater robustness, once the machines that perform the operation simultaneously themselves also ensure redundancies in case of equipment failure.

In addition, the present invention offers the ease of self-organization of the system, in order to attend different scenarios of load movement.

BRIEF DESCRIPTION OF THE INVENTION

The present invention discloses an equipment and a method for moving containers, with the aim to store and to arrange the containers in port terminals, in a way to optimize the space and the processes of moving the load.

BRIEF DESCRIPTION OF THE DRAWINGS

The drawings associated to the present invention, by way of example and not being limitative, will make it better to comprehend the invention.

DETAILED DESCRIPTION OF THE INVENTION

Figure 1:
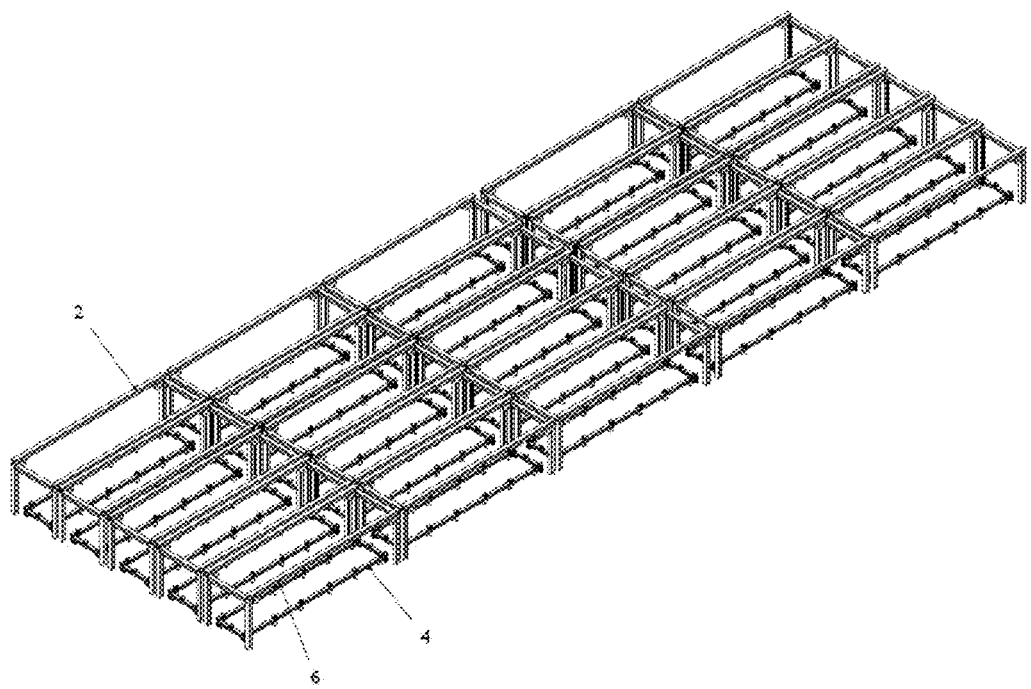
FIG. 1 is a perspective view of the containers stacking support.
Figure 2:
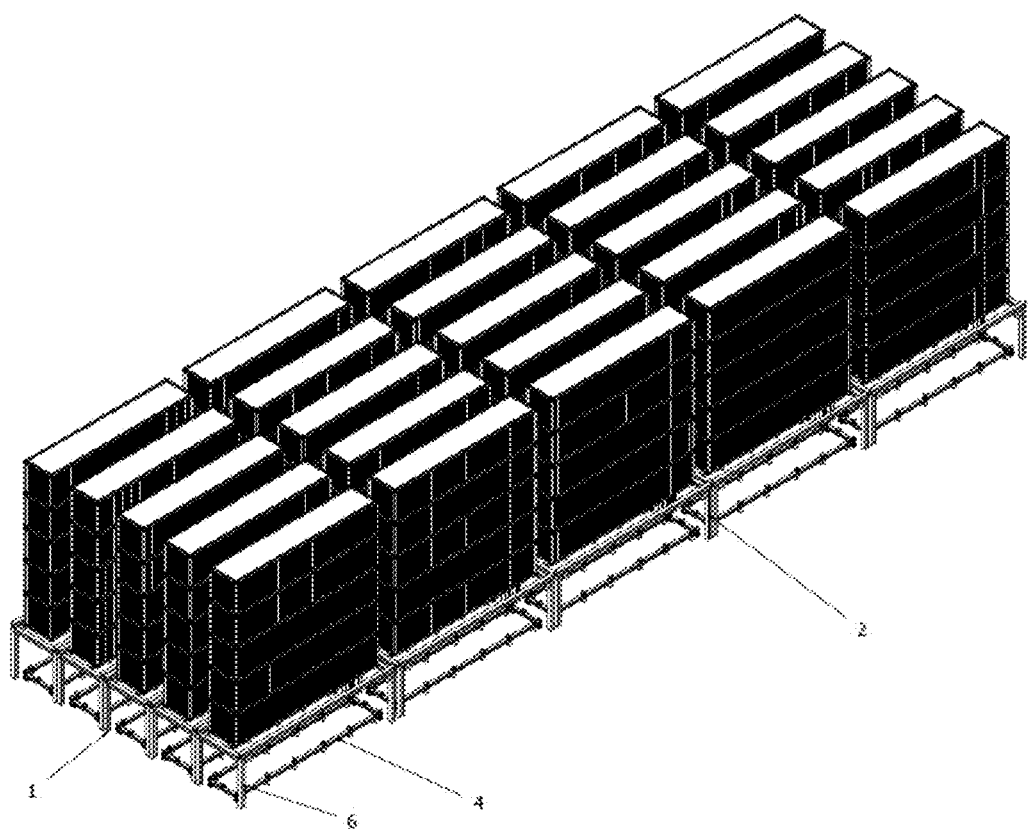
FIG. 2 is a perspective view of the containers stacking support loaded.
Figure 3:
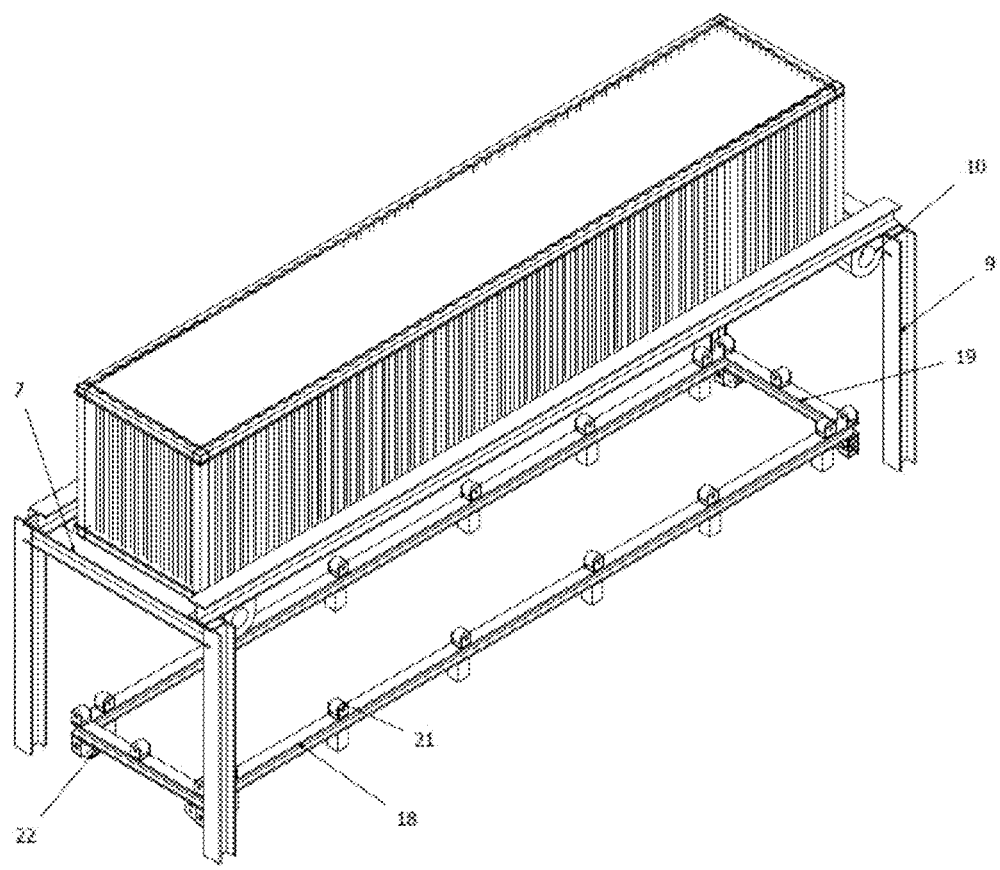
FIG. 3 is a perspective view of a structural unit (6) of the stacking support with a container on the top of it.
Figure 4:
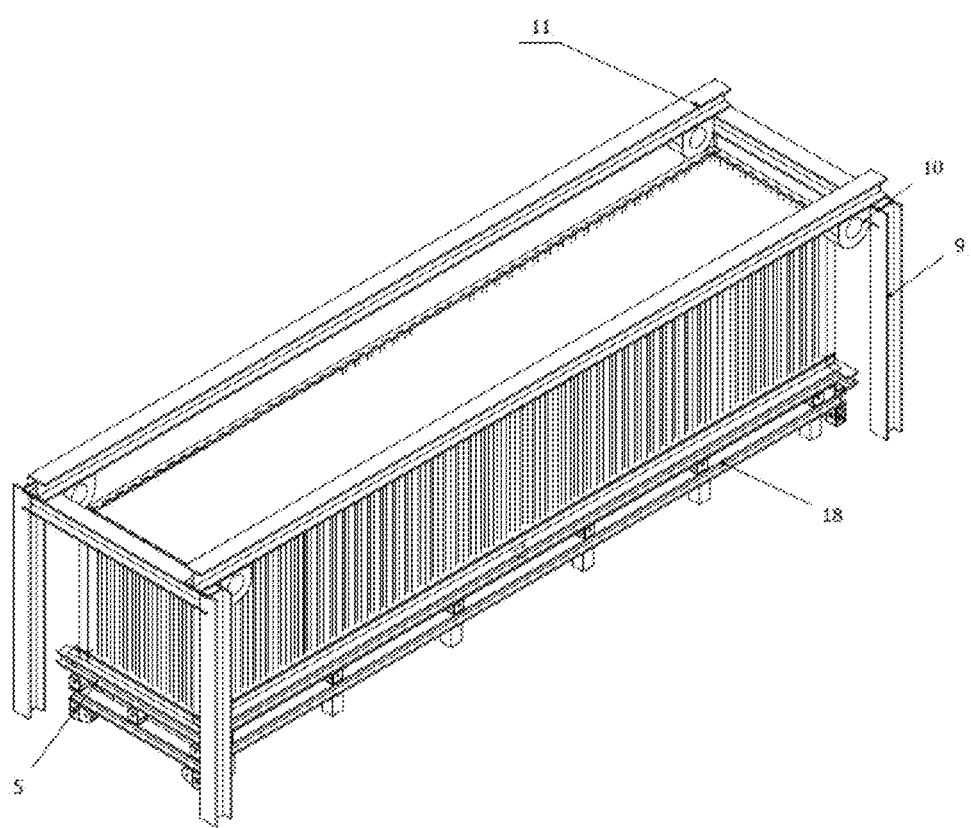
FIG. 4 is a perspective view of a structural unit (6) of the stacking support with a container under it.
Figure 5:
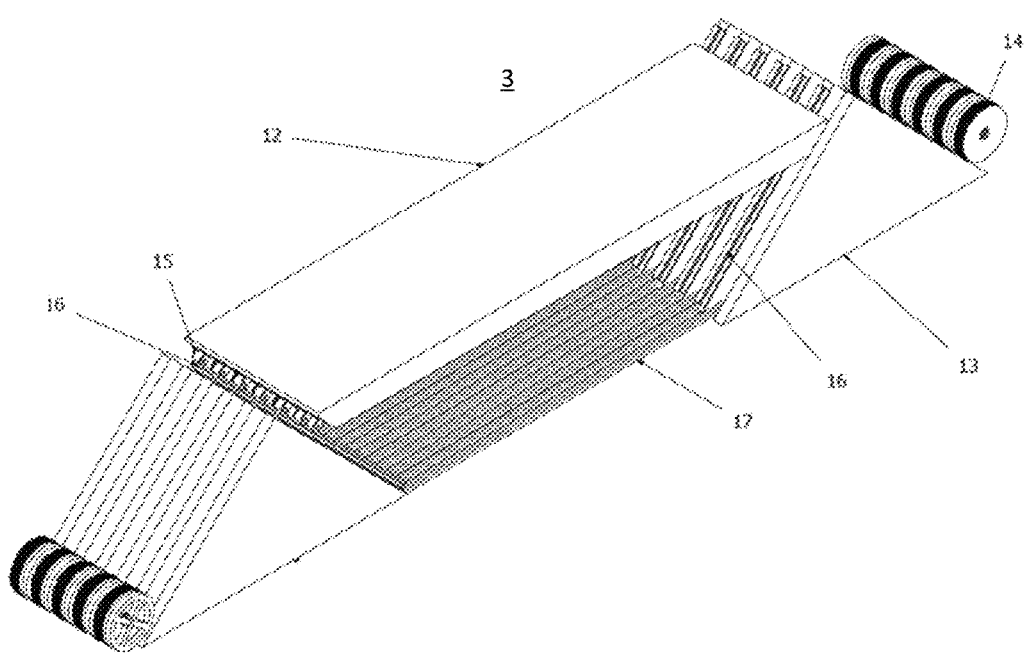
FIG. 5 is a perspective view of the lifting system (3).
Figure 6:
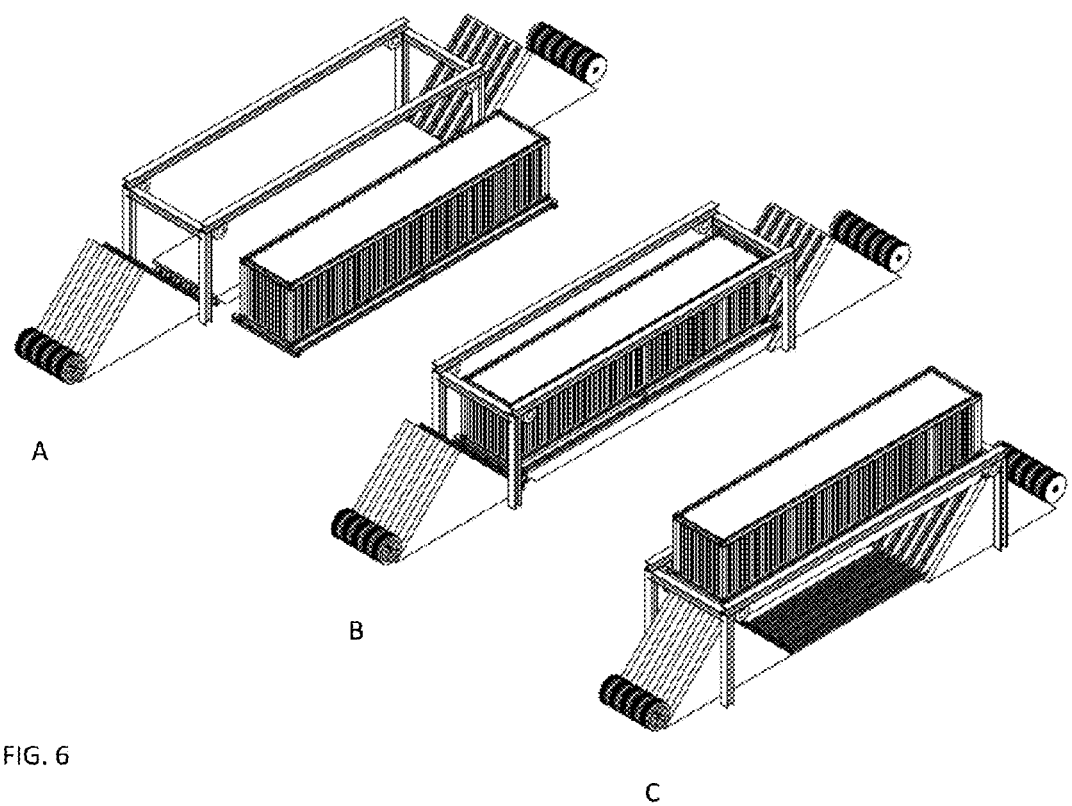
FIG. 6 is a perspective view of a lifting operation of a container.
Figure 7:
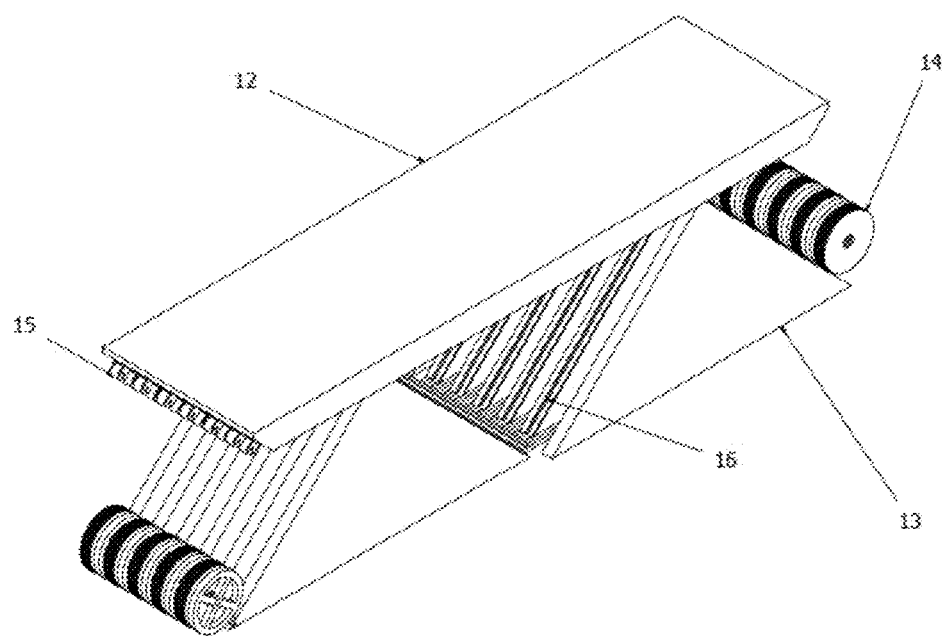
FIG. 7 is a perspective view of the lifting system (3) in a compacted position for horizontal displacement.
Figure 8:
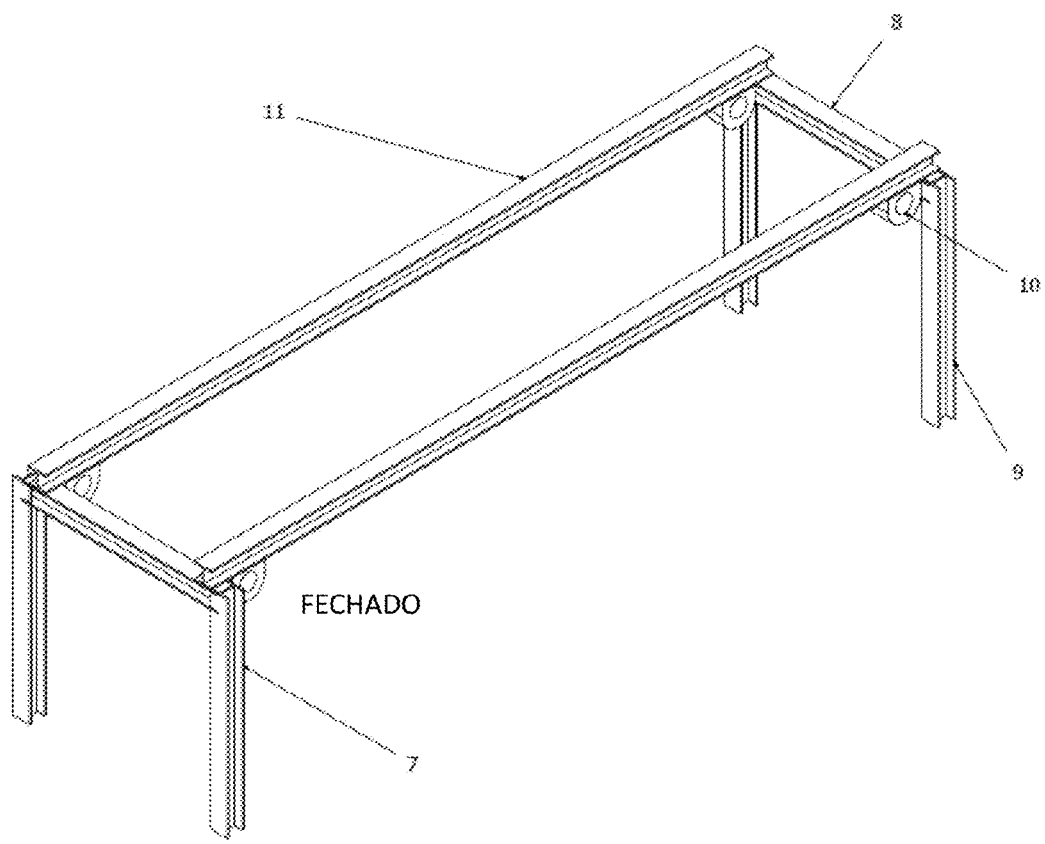
FIG. 8 is a perspective view of the structural unit (6) of the stacking support in a closed position.
Figure 9:
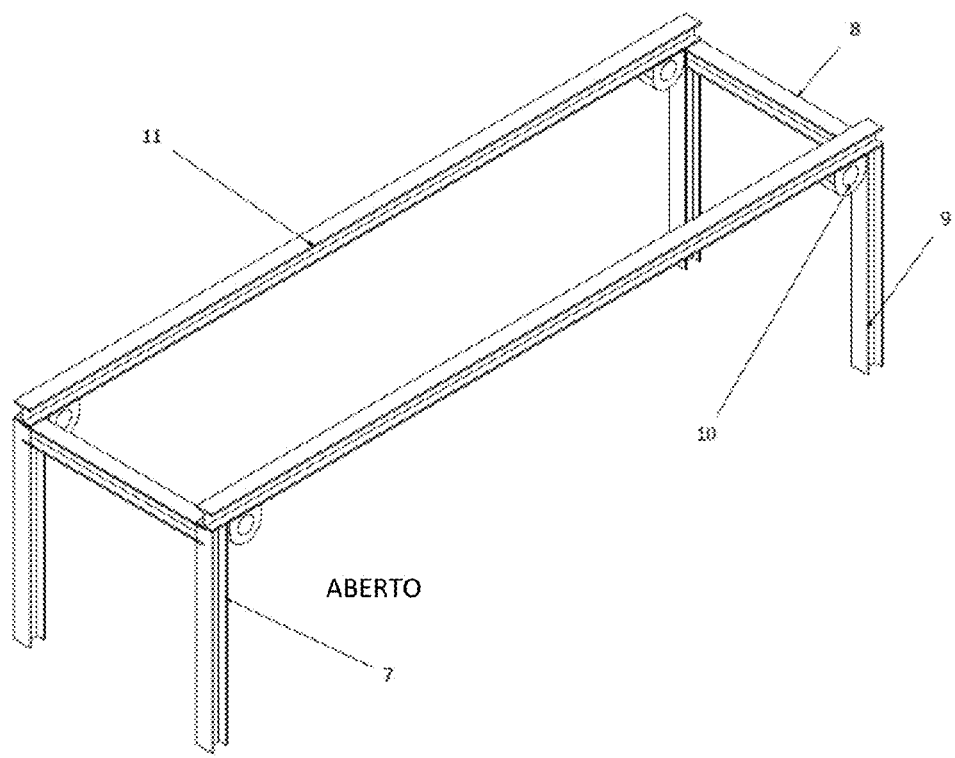
FIG. 9 is a perspective view of the structural unit (6) of the stacking support in an open position.
Figure 10:
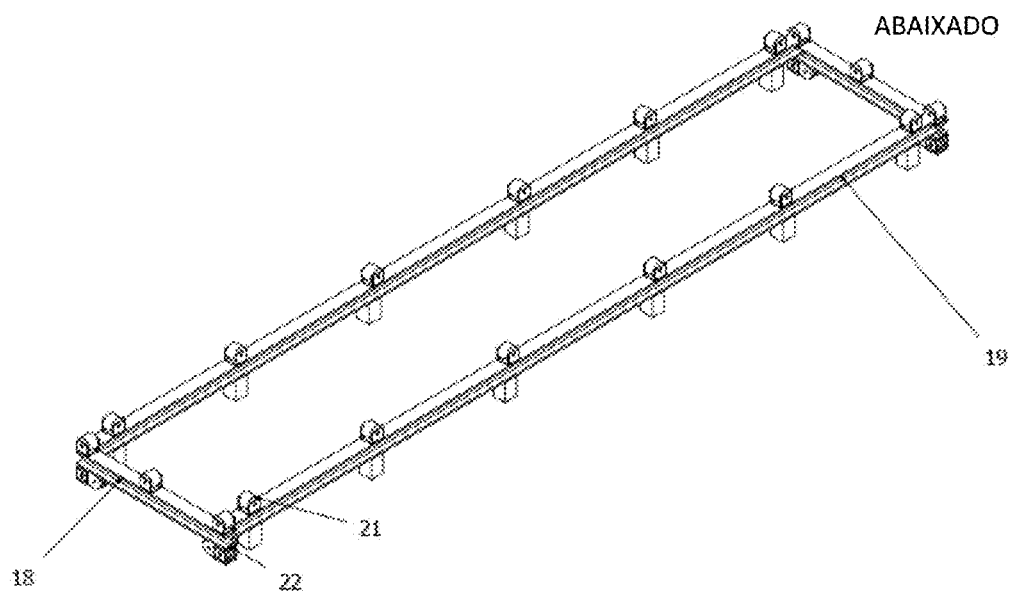
FIG. 10 is a perspective view of the roller system (4) for horizontal moving with the longitudinal line on active mode.
Figure 11:
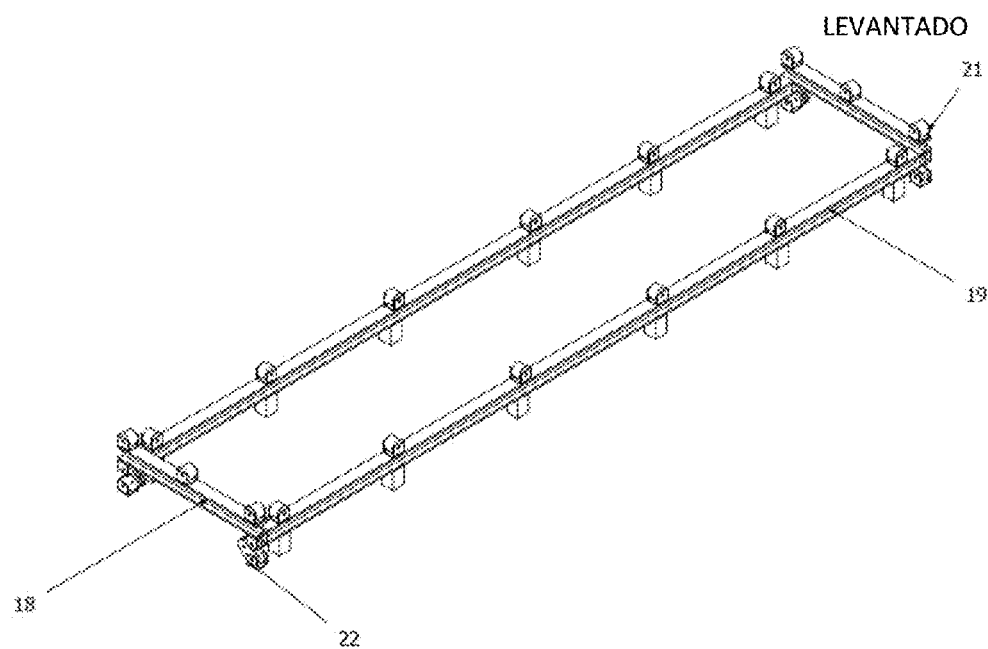
FIG. 11 is a perspective view of the roller system (4) for horizontal moving with the cross-sectional line on active mode.
Figure 12:
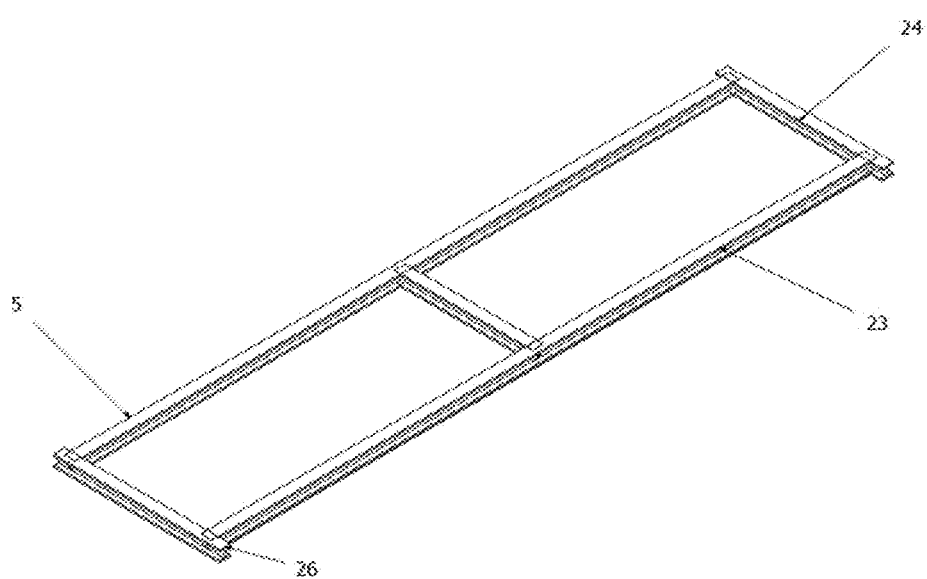
FIG. 12 is a perspective view of the movable interface platforms (5) of the containers seen from the top to the bottom.
Figure 13:
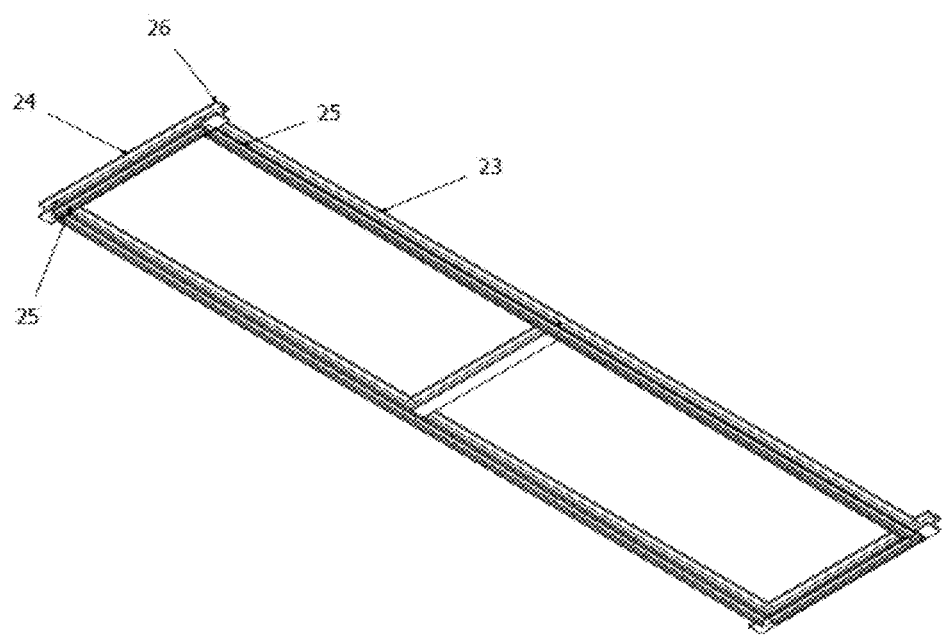
FIG. 13 is a perspective view of the movable interface platforms (5) of the containers seen from the bottom to the top.
Figure 14:
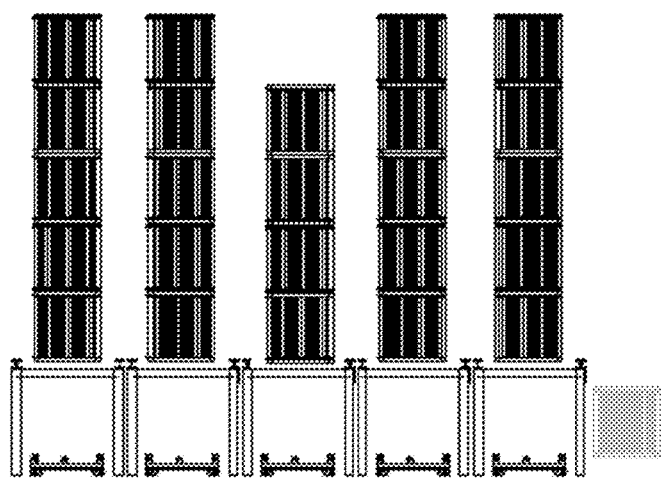
FIG. 14 is a view of the stacking operation of a container
Figure 14:
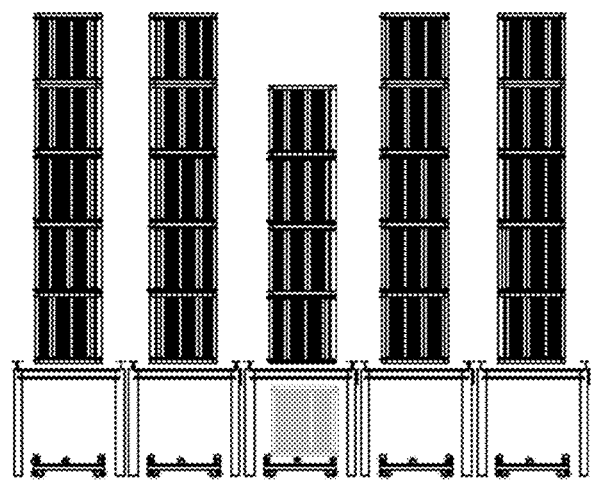
Figure 14:
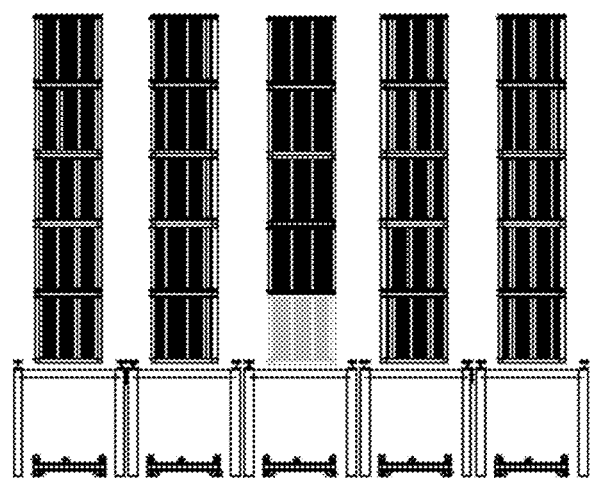
Figure 15:
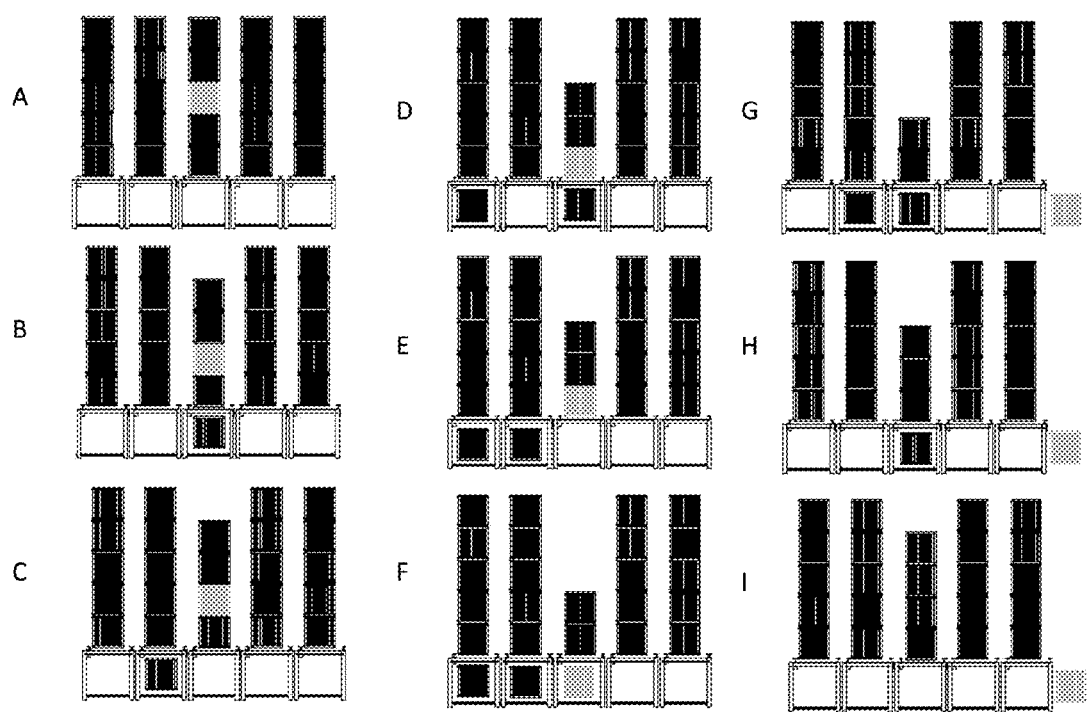
FIG. 15 is a view of the retrieve operation of a container.

The present invention discloses an equipment and a method for moving containers, with the aim to store and to arrange the containers in port terminals, in a way to optimize the space and the processes of moving the load.

As proposed herein, the equipment (1) for moving containers comprises:

a set of fixed elevated supports (2);
a lifting system (3);
a roller system (4) for horizontal moving; and
movable interface platforms (5).

The set of fixed elevated supports (2) comprises a structural unit (6), duly lined longitudinally and cross-sectionally, and elevated beams (7), which are formed by columns (9), fixed beams (8) and power-driven movable support beams (11).

The power-driven movable support beams (11) have the function of locking the stacks of containers when lifted and, also, allowing their release during the containers release operations.

The lifting system (3) is formed by an internal lifting platform (12) located between two cars (13), which presents a triangular prism-shaped structure and moves in opposite ways on longitudinal direction of the horizontal plane. This system moves independently to any position of the equipment (1) through the roller system (4) for horizontal moving.

The lifting platform (12) comprises rollers (15) which slide through tracks (16) located on the sloped plane of the cars (13). During the lifting, the cars (13) approach and lift the lifting platform (12) at an amplitude corresponding to one level.

The approach occurs by the traction of steel cables (17), which connects the cars (13) and roll up on the barrels (14). In an opposite way, the spacing occurs by the action of the own weight of the lifting platform (12) of the lifting system (3).

The roller system (4) for horizontal moving is formed by fixed longitudinal roller lines (19) and cross-sectional roller lines (18) which height can be regulated, which can be adjusted to be on the top, on the bottom or on the same level of the longitudinal roller lines (19). Also, the roller system (4) provides the movement of the movable interface platforms (5). The lifting of the cross-sectional lines level occurs by the mechanism for changing the active line (22). The roller (21) are power-driven, wherein the velocity and the sense of the rotation are controlled and in both ways, and lined in two parallels lines in the longitudinal direction (19) and two parallels lines in the cross-sectional direction (18).

When the cross-sectional roller line (18) is leveled above the longitudinal roller line (19), the cross-sectional line (18) will be the active one and the container or the lifting system (3) will move in a cross-sectional direction.

When the cross-sectional roller line (18) is leveled under the longitudinal roller line (19), the longitudinal rotation line (19) will be the active one and the container or the lifting system (3) will move in a longitudinal direction.

Finally, the movable interface platform (5) of containers is formed by a support framework comprising cross-sectional beams (24) and longitudinal beams (23), with spare ends for supporting on the holes (10) of the movable beams of the structural unit (6). The movable interface platform (5) has the function of supporting the container during horizontal movement and during stacking.

Also, it presents cross-sectional and longitudinal tracks (25), which allow the displacement through the roller system (4) for horizontal moving, as well as supports (26) which allow its fastening in the power-driven movable support beams (11) of the structural unit (6).

In a flat ground area, the fixed elevated supports (2) are installed, which will maintain the containers lifted at a determined height, in a way to allow other containers to horizontally move under them.

At ground level, the containers are placed on the movable interface platforms (5) in a defined receiving position. Thus, they will be able to be horizontally conducted by the roller system (4) into pre-determined positions.

From that point, one by one, the containers are lifted to the first level of the equipment (1) through the lifting system (3) and, there, they will be supported by the fixed elevated supports (2).

A container which is placed under another container that has been previously lifted can be placed on that same position by lifting the container which was there to the second level of the system. In the same way, a third container can take the position of the second one, putting the first one on the third level and, so on consecutively.

This procedure represents a container stacking from the bottom to the top, which will be performed automatically and allows a constant repositioning of the containers during the movements. The equipment (1) can be controlled to rearrange the stacks in accordance with the updates on the schedule of entries and releases of the containers in the terminal through trucks and of shipping and landing through ships.

The present invention also provides a method for moving containers, which stacking comprises the following steps:
a) Horizontal displacement of the lifting system (3) up to the position of entry of the container to be stacked on the stack;
b) Horizontal displacement of the container from the initial position up to the position of the stack of interest performed at ground level through the roller system (4) for horizontal moving;
c) Stacking from the bottom to the top of the container through the lifting system (3) and the power-driven movable support beams (11) of the structural unit (6).

At steps (a) and (b), the horizontal displacement occurs on the roller system (4) for horizontal moving, up to destiny position, through the rotation movement of the power-driven roller (21) and change of directions by the driving of the mechanism for changing the active line (22).

Step (c) comprises the following sub-steps:
c.1) Positioning of the movable interface platforms (5) of the container on top of the lifting platform (12) of the lifting system (3);
c.2) Initial lifting of the container up to the contact with the movable interface platforms (5) of the container above;
c.3) Opening of the power-driven movable support beams (11);
c.4) Final lifting of the container up to leveling the supports (26) of the movable interface platforms (5) of the container with the holes (10) of the power-driven movable support beams (11);
c.5) Closing of the power-driven movable support beams (11);
c.6) Lowering of the lifting platform (12) of the lifting system (3).

The unstacking, in turn, comprises the following steps:
A) Horizontal displacement of the lifting system (3) up to the withdraw position of the container to be released from the stack;
B) Lowering of the containers positioned under the container to be released from the stack and posterior lowering of the container to be released from the stack;
C) Horizontal displacement of the container from the withdraw position performed at ground level by the roller system (4) for horizontal moving up to the removal position at the limit of the equipment (1);
D) Re-stacking of the containers that were under the container to be released before the beginning of the process.

At steps (A) and (C), the horizontal displacement occurs on the roller system (4) for horizontal moving up to the destiny position through the rotation movement of the power-driven rollers (21) and direction changes by the driving of the mechanism for changing the active line (22).

On step (B), the lowering of the containers comprises the following sub-steps:
B.1) Lifting of the lifting platform (12) of the lifting system (3) up to the contact with the movable interface platforms (5) of the container;
B.2) Opening of the power-driven movable support beams (11);
B.3) Lowering of the containers stack up to leveling the supports (26) of the movable interface platforms (5) of the container with the holes (10) of the power-driven movable support beams (11);
B.4) Closing of the power-driven movable support beams (11);
B.5) Final lowering of the lower container;
B.6) Release of the container from the lifting system (3) by the roller system (4) for horizontal moving.

Also, the restacking of the containers comprises the repetition of step (c) and its sub-steps (c.1) to (c.6) and the rearrange of the containers comprises the repetition of steps (B), (C) and (D).

Nowadays, the most well-established container moving concept in terminals consists on the coordinated action of some equipment such as gantries for containers, portainers, container trucks, cranes and containers forklifts. In the referred concept, the containers are stacked in a determined number of levels in queues arranged side-by-side, forming sets separated through operation halls.

The operational capacity of the traditional terminals is limited due to logical operational restrictions for an optimized relationship between the number of stacking levels, number of queues arranged side-by-side, length of these queues and number of moving equipment involved on the operation and occupied area. Many times, the movement of the load in the port terminals becomes the bottleneck on the importation and exportation processes, demanding plenty of financial resources.

Thus, the system disclosed also allows a continuous and automatic rearrangement of the containers, using briefer moves and in a smaller number. The increase of the number of possible combinations of these operations allows the potentiation of the use of the optimization resources by computational intelligence.

All this factors, when summed, result in an operational viability for a greater number of containers stacked on a stack and, thus, a greater storage capacity in the same courtyard area of the conventional system.

Once broadly applied, this equipment allows the decrease of the space and time for receiving and retrieving containers, decreasing operational costs for moving and, also, increasing the economic efficiency of the international market.

The present invention was herein disclosed in what concerns to its preferred embodiment. However, other modifications and variations are possible through the present description, being also inserted at the scope of the invention herein revealed.

The invention claimed is:

1. Equipment for moving containers, said equipment comprising:
    a plurality of fixed elevated supports aligned longitudinally and transversally side-by-side, wherein each fixed elevated support is formed by:
        a pair of front columns and a fixed elevated support front beam extending between said pair of front columns,
        a pair of rear columns and a fixed elevated support rear beam extending between said pair of rear columns, and
        a pair of power-driven movable support beams extending between said pair of front columns and said pair of rear columns, wherein ends of said pair of power-driven movable support beams are positioned over said fixed elevated support front beam and said fixed elevated support rear beam, said power-driven movable support beams further comprising a pair of front holding holes provided near said fixed elevated support front beam and a pair of rear holding holes provided near said fixed elevated support rear beam;
    a roller system positioned at ground level under said plurality of fixed elevated supports;
    a lifting system formed by an internal lifting platform located between two moving cars that lift said internal lifting platform a vertical distance corresponding to a stacking level when said moving cars are selectively moved close to each other; and
    a movable interface platform formed by a platform front beam, a platform rear beam and a pair of platform longitudinal beams extending between said platform front and platform rear beams, wherein ends of said platform front and platform rear beams extend away from said pair of platform longitudinal beams so that the platform front beam ends are inserted into the pair of front holding holes and the platform rear beam ends are inserted into the pair of rear holding holes when said movable interface platform is lifted.

2. The equipment according to claim 1, wherein said pair of power-driven movable support beams are selectively controlled to:
    move away from each other allowing lifting or lowering a container; and
    move close to each other so that the platform front beam ends of the movable interface platform are inserted into the pair of front holding holes and the platform rear beam ends of the movable interface platform are inserted into the pair of rear holding holes.

3. The equipment according to claim 1, wherein said lifting system is selectively moved longitudinally and transversally under said plurality of fixed elevated supports by means of said roller system.

4. The equipment according to claim 1, wherein said internal lifting platform is provided with a plurality of rollers and each moving car comprises a triangular prism-shaped structure that has a plurality of tracks provided on a side that faces the other moving car so that the rollers slide through said plurality of tracks when said internal lifting platform is lifted or lowered.

5. The equipment according to claim 1, wherein said lifting system is provided with steel wires and barrels controlled to selectively wind said steel wires to move the two moving cars close to each other, effectively lifting said internal lifting platform.

6. The equipment according to claim 1, wherein the two moving cars are moved away from each other by the weight of said internal lifting platform.

7. The equipment according to claim 1, wherein said roller system comprises a roller front transversal beam, a roller rear transversal beam and a pair of roller longitudinal beams extending between said roller front and roller rear transversal beams, wherein a plurality of power-driven rollers are provided on said roller front transversal beam, said roller rear transversal beam and said pair of roller longitudinal beams.

8. The equipment according to claim 7, wherein the speed and rotating direction of said power-driven rollers are selectively controlled.

9. The equipment according to claim 7, wherein said roller front and roller rear transversal beams are selectively raised or lowered so that the power-driven rollers provided on said roller front and roller rear transversal beams are below, above or at the same level as the power-driven rollers provided on said pair of roller longitudinal beams.

10. A method for moving containers comprising the steps of:
    providing:
        a plurality of fixed elevated supports aligned longitudinally and transversally side-by-side, wherein each fixed elevated support is formed by:
            a pair of front columns and a fixed elevated support front beam extending between said pair of front columns,
            a pair of rear columns and a fixed elevated support rear beam extending between said pair of rear columns, and
            a pair of power-driven movable support beams extending between said pair of front columns and said pair of rear columns, wherein ends of said pair of power-driven movable support beams are positioned over said fixed elevated support front beam and said fixed elevated support rear beam, said power-driven movable support beams further comprising a pair of front holding holes provided near said fixed elevated support front beam and a pair of rear holding holes provided near said fixed elevated support rear beam;
        a roller system positioned at ground level under said plurality of fixed elevated supports;

a lifting system formed by an internal lifting platform located between two moving cars that lift said internal lifting platform a vertical distance corresponding to a stacking level when said moving cars are selectively moved close to each other; and a movable interface platform formed by a platform front beam, a platform rear beam and a pair of platform longitudinal beams extending between said platform front and platform rear beams, wherein ends of said platform front and platform rear beams extend away from said pair of platform longitudinal beams so that the platform front beam ends are inserted into the pair of front holding holes and the platform rear beam ends are inserted into the pair of rear holding holes when said movable interface platform is lifted;

moving the lifting system to a position under a desired fixed elevated support;

moving said movable interface platform carrying a container to the position under said desired fixed elevated support; and lifting said movable interface platform from ground level using said lifting system and maintaining said container at a top part of said desired fixed elevated support by selectively moving said pair of power-driven movable support beams.

11. The method according to claim 10, wherein the lifting system and the movable interface platform carrying a container are moved to the position under said desired fixed elevated support by controlling the speed and direction of the power-driven rollers and selectively changing between a longitudinal and transversal direction by lowering or raising said roller front and roller rear transversal beams.

12. The method according to claim 10, wherein the step of lifting said container from ground level comprises:
positioning said movable interface platform carrying the container on top of the lifting platform;
lifting said movable interface platform until said container contacts another movable interface platform carrying another container already positioned on a top part of said desired fixed elevated support;
moving said pair of power-driven movable support beams away from each other;
continue lifting said movable interface platform until the platform front beam ends and the platform rear beam ends of the movable interface platform are aligned with the pair of front holding holes and the pair of rear holding holes, respectively;
moving said pair of power-driven movable support beams close to each other so that the platform front beam ends and the platform rear beam ends of the movable interface platform are inserted into the pair of front holding holes and the pair of rear holding holes, respectively; and
lowering said lifting platform.

13. The method according to claim 10, wherein unstacking a desired container comprises the steps of:
moving the lifting system to a position under a fixed elevated support containing said desired container;
if there are other containers stacked under said desired container, lowering said other containers to ground level prior to lowering the desired container to ground level, otherwise lowering said desired container to ground level;
moving the desired container to a removal position; and
if there were other containers previously stacked under said desired container restacking said other containers from ground level to the fixed elevated support they were previously stacked on.

14. The method according to claim 13, wherein the lifting system and the containers are moved at ground level by controlling the speed and direction of the power-driven rollers and selectively changing between a longitudinal and transversal direction by lowering or raising said roller front and roller rear transversal beams.

15. The method according to claim 13, wherein the step of lowering said other containers to ground level if there are other containers stacked under said desired container comprises:
lifting the lifting platform until contact with the movable interface platform occurs;
moving said pair of power-driven movable support beams away from each other;
lowering the movable interface platform carrying each container until the platform front beam ends and the platform rear beam ends of the movable interface platform are aligned with and inserted into the pair of front holding holes and the pair of rear holding holes of said pair of power-driven movable support beams, respectively; and
releasing each container from the lifting system via the roller system.

* * * * *